(12) United States Patent
Huang et al.

(10) Patent No.: US 9,822,898 B2
(45) Date of Patent: Nov. 21, 2017

(54) SYSTEMS AND METHODS FOR LONG SOFT START TIME LOAD SWITCH CONTROL

(71) Applicant: Dell Products L.P., Round Rock, TX (US)

(72) Inventors: Wen-Hung Huang, Taipei (TW); Hsien Tsung Lin, Taoyuan County (TW); Chih-Kai Wang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/871,364

(22) Filed: Sep. 30, 2015

(65) Prior Publication Data

US 2017/0090487 A1    Mar. 30, 2017

(51) Int. Cl.
  *G05F 3/08* (2006.01)
  *F25D 17/02* (2006.01)
  *F16K 31/06* (2006.01)

(52) U.S. Cl.
  CPC .......... *F16K 31/0655* (2013.01); *F25D 17/02* (2013.01); *G05F 3/08* (2013.01)

(58) Field of Classification Search
  CPC ....... F16K 31/00; F16K 31/0655; G05D 7/00; G05D 7/0641; G05F 3/00; G05F 3/08; H03K 17/04123; H03K 17/063; H03K 17/0822; H03K 17/00; H03K 17/687; H03K 2217/00; H03K 2217/0036

USPC .......................................... 327/427
See application file for complete search history.

(56) References Cited

U.S. PATENT DOCUMENTS

| | | | | |
|---|---|---|---|---|
| 5,172,717 A | * | 12/1992 | Boyle | E21B 34/06 137/155 |
| 2009/0121774 A1 | * | 5/2009 | Dathe | H03K 17/0822 327/419 |
| 2011/0089993 A1 | * | 4/2011 | Shumkov | H02M 1/08 327/427 |
| 2013/0026829 A1 | * | 1/2013 | Kartal | H03K 17/063 307/10.6 |

* cited by examiner

*Primary Examiner* — Lincoln Donovan
*Assistant Examiner* — David Mattison
(74) *Attorney, Agent, or Firm* — Jackson Walker L.L.P.

(57) ABSTRACT

A circuit may include a source input for receiving an input voltage, a load output for generating an output voltage, a load switch coupled at its source to the source input and coupled at its drain to the load output which is configured to pass the input voltage to the load output when the load switch is activated, an enable input for receiving an enable voltage which is indicative of whether the load switch is to be activated or deactivated, and a leakage reduction circuit coupled between the enable input and a gate of the load switch, wherein the leakage reduction circuit is configured to electrically couple the gate of the load switch to the source of the load switch such that a source-to-gate voltage is maintained below a threshold voltage for activating the load switch when the enable voltage indicates that the load switch is to be deactivated.

19 Claims, 2 Drawing Sheets

SYSTEMS AND METHODS FOR LONG SOFT START TIME LOAD SWITCH CONTROL

TECHNICAL FIELD

The present disclosure relates in general to information handling systems, and more particularly to systems and methods for providing for a long soft start time for a valve of a cooling system of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the capabilities of information handling systems have improved, the power requirements of information handling systems and their component information handling resources have increased. Accordingly, the amount of heat produced by such information handling resources has increased. Because the electrical properties of information handling resources may be adversely affected by the presence of heat (e.g., some information handling resources may not operate correctly outside of a particular range of temperatures), information handling systems often include cooling systems configured to cool such information handling resources.

Traditionally, information handling resources have been cooled via the impingement of air driven by one or more fans. As the density of information handling resources present in information handling systems has increased, and as information handling resources have become faster (and thus hotter), the airflow required to provide adequate cooling has increased, leading to the need for more powerful fans and/or a greater numbers of fans. This leads to yet more power consumption, larger information handling system size, and excessive noise. In addition, because fans often transfer heat t0 those areas proximate to the information handling system being cooled, users of such information handling systems are often required to tolerate higher-than-typical temperatures.

As an improvement over traditional fan-based cooling systems, some information handling system manufacturers have provided mechanisms to cool individual component information handling resources with liquid. Such approaches use pumps to circulate cooling fluid over a heat exchanger plate or "cold plate" in contact with a component, and then to a liquid-to-air heat exchanger (e.g., radiator). The flow of liquid is generally controlled by one or more pumps and/or one or more valves. With respect to a valve used in a cooling system, a soft start time is often required for such a valve to prevent excessive stress on a fluidic conduit coupled to the valve that may occur if the valve opens quickly and air exists in the fluidic conduit.

SUMMARY

In accordance with the teachings of the present disclosure, the disadvantages and problems associated with thermal management of information handling resources may be reduced or eliminated.

In accordance with embodiments of the present disclosure, a circuit may include a source input for receiving an input source voltage, a load output for generating an output voltage, a load switch coupled at its source terminal to the source input and coupled at its drain terminal to the load output which is configured to pass the input source voltage to the load output when the load switch is activated, an enable input for receiving an enable voltage which is indicative of whether the load switch is to be activated or deactivated, and a leakage reduction circuit coupled between the enable input and a gate terminal of the load switch, wherein the leakage reduction circuit is configured to electrically couple the gate terminal of the load switch to the source terminal of the load switch such that a source-to-gate voltage is maintained below a threshold voltage for activating the load switch when the enable voltage indicates that the load switch is to be deactivated.

In accordance with these and other embodiments of the present disclosure, a system may include a valve and a control circuit for controlling the valve. The control circuit may include a source input for receiving an input source voltage, a load output for generating an output voltage, a load switch coupled at its source terminal to the source input and coupled at its drain terminal to the load output which is configured to pass the input source voltage to the load output when the load switch is activated, an enable input for receiving an enable voltage which is indicative of whether the load switch is to be activated or deactivated, and a leakage reduction circuit coupled between the enable input and a gate terminal of the load switch, wherein the leakage reduction circuit is configured to electrically couple the gate terminal of the load switch to the source terminal of the load switch such that a source-to-gate voltage is maintained below a threshold voltage for activating the load switch when the enable voltage indicates that the load switch is to be deactivated.

In accordance with these and other embodiments of the present disclosure, a method may include, in a circuit comprising a source input for receiving an input source voltage, a load output for generating an output voltage, a load switch coupled at its source terminal to the source input and coupled at its drain terminal to the load output, the load switch configured to pass the input source voltage to the load output when the load switch is activated, and an enable input for receiving an enable voltage, the enable voltage indicative of whether the load switch is to be activated or deactivated, electrically coupling the gate terminal of the load switch to the source terminal of the load switch such that a source-to-gate voltage is maintained below a threshold voltage for activating the load switch when the enable voltage indicates that the load switch is to be deactivated.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
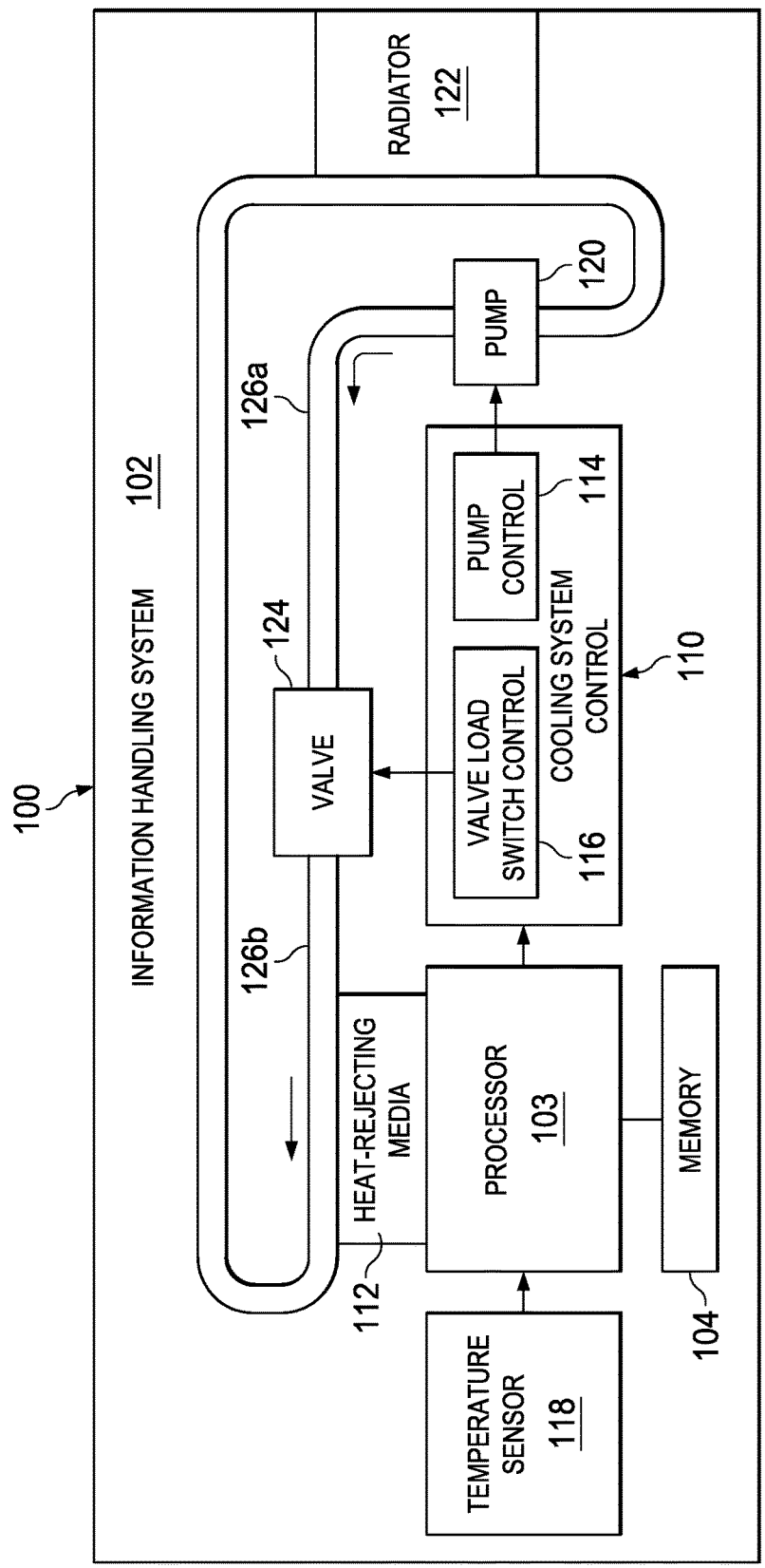
FIG. 1 illustrates a block diagram of selected components of an example information handling system, in accordance with embodiments of the present disclosure.
Figure 2:
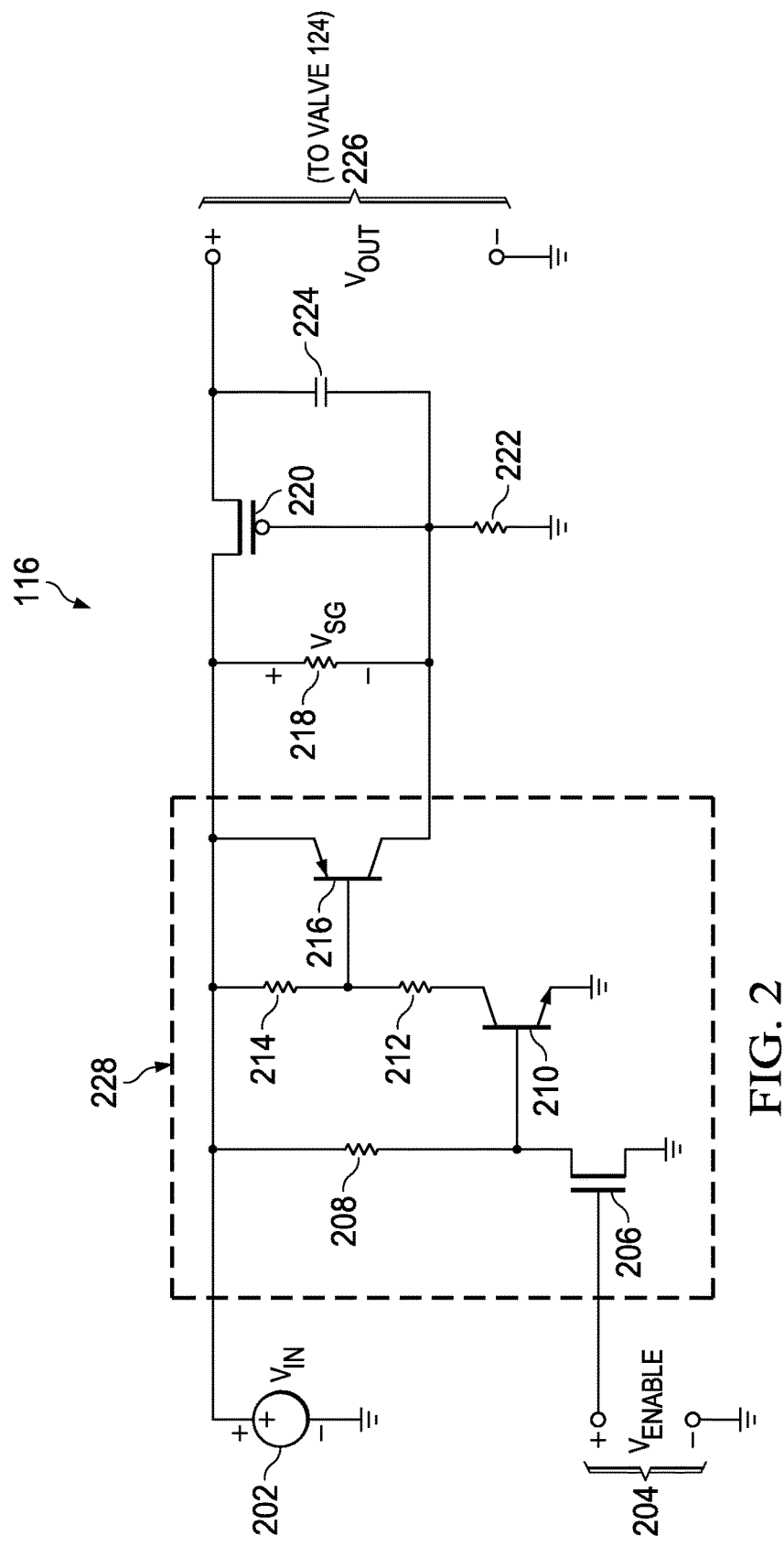
FIG. 2 illustrates a circuit diagram of selected components of a valve load switch control, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102 including functionality for providing user-visible thermal performance degradation monitoring. In some embodiments, information handling system 102 may comprise a server. In other embodiments, information handling system 102 may be a personal computer (e.g., a desktop computer, a laptop, notebook, tablet, handheld, smart phone, personal digital assistant, etc.). In yet other embodiments, information handling system 102 may comprise a storage enclosure.

As shown in FIG. 1, information handling system 102 may include a chassis 100 housing a processor 103, a memory 104, and a cooling system comprising a cooling system control 110, heat-rejecting media 112, temperature sensor 118, pump 120, radiator 122, valve 124, and fluidic conduits 126 (e.g., fluidic conduits 126a and 126b).

Chassis 100 may be an enclosure that serves as a container for various information handling systems and information handling resources, and may be constructed from steel, aluminum, plastic, and/or any other suitable material. Although the term "chassis" is used, chassis 100 may also be referred to as a case, cabinet, tower, box, enclosure, and/or housing. In certain embodiments, chassis 100 may be configured to hold and/or provide power to a plurality of information handling systems and/or information handling resources.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Cooling system control 110 may be communicatively coupled to processor 103, and may include any system, device, or apparatus (e.g., a processor, controller, etc.) configured to control components of a cooling system for cooling a temperature of one or more information handling resources of information handling system 102. For example, cooling system control 110 may be configured to control pump 120 and/or valve 124 based on thermal data sensed by temperature sensor 118, so as to maintain a safe operating temperature for one or more information handling resources. Accordingly, cooling system control 110 may include a pump control subsystem 114 for controlling operation of pump 120 (e.g., a pressure applied to coolant fluid in conduits 126 for moving such fluid through conduits 126) and a valve load switch control subsystem 116 for controlling operation of valve 124 (e.g., opening or closing valve 124, controlling an aperture of valve 124, etc.). An example embodiment of valve load switch control subsystem 116 is described in greater detail with respect to FIG. 2, below.

Heat-rejecting media 112 may include any system, device, or apparatus configured to transfer heat from an information handling resource (e.g., processor 103, as shown in FIG. 1), thus reducing a temperature of the information handling resource. For example, heat-rejecting media 112 may include a solid thermally coupled to the information handling resource (e.g., heatpipe, heat spreader, heatsink, finstack, etc.) such that heat generated by the information handling resource is transferred from the information handling resource. For example, in the embodiments represented by FIG. 1, heat-rejecting media 112 may be thermally coupled between processor 103 and fluidic conduit 126b, such that heat generated by processor 103 is transferred to a coolant liquid inside of fluidic conduit 126b.

Temperature sensor 118 may be any system, device, or apparatus (e.g., a thermometer, thermistor, etc.) configured to communicate a signal to processor 103 or another controller indicative of a temperature within information handling system 102. In many embodiments, information handling system 102 may comprise a plurality of temperature sensors 118, wherein each temperature sensor 118 detects a temperature of a particular component and/or location within information handling system 102.

Pump 120 may be fluidically coupled to one or more fluidic conduits 126 and may comprise any mechanical or electro-mechanical system, apparatus, or device operable to produce a flow of fluid (e.g., fluid in one or more fluidic channels 126). For example, pump 120 may produce fluid flow by applying a pressure to fluid in fluidic conduits 126. As described above, operation of pump 120 may be controlled by pump control 114 which may control electro-mechanical components of pump 120 in order to produce a desired rate of coolant flow.

Radiator 122 may include any device, system or apparatus configured to transfer thermal energy from one medium (e.g., fluid within fluidic conduit 126b) to another (e.g., air external to chassis 100) for the purpose of cooling and heating. In some embodiments, radiator 122 may include fluidic channels and/or conduits in at least a portion of radiator 122. Such fluidic channels and/or conduits may be fluidically coupled to one or more of fluidic conduits 126 and pump 120.

Valve 124 may include any device, system or apparatus that regulates, directs, and/or controls the flow of a fluid (e.g., a coolant liquid in fluidic conduits 126) by opening, closing, or partially obstructing one or more passageways. When valve 124 is open, coolant liquid may flow in a direction from higher pressure to lower pressure. As described above, the operation of valve 124 (e.g., opening and closing, size of an aperture of valve 124) may be controlled by valve load switch control 124.

In operation, pump 120 may induce a flow of liquid (e.g., water, ethylene glycol, propylene glycol, or other coolant) through various fluidic conduits 126 of information handling system 102, valve 124 and/or radiator 122. As fluid passes by heat-rejecting media 112 in fluidic conduit 126b, heat may be transferred from heat-rejecting media 112 to the liquid coolant in fluidic conduit 126b. As such heated coolant flows by radiator 122, heat from the coolant may be transferred from the coolant to air ambient to chassis 100, thus cooling the fluid.

In addition to processor 103, memory 104, cooling system control 110, heat-rejecting media 112, temperature sensor 118, pump 120, radiator 122, valve 124, and fluidic conduits 126, information handling system 102 may include one or more other information handling resources.

FIG. 2 illustrates a circuit diagram of selected components of valve load switch control subsystem 116, in accordance with embodiments of the present disclosure. As shown in FIG. 2, valve load switch control subsystem 116 may include an input voltage source 202, an enable input 204, an n-type field-effect transistor (NFET) 206, n-p-n bipolar junction transistor (NPN BJT) 210, p-n-p bipolar junction transistor (PNP BJT) 216, a load switch implemented as a p-type field effect transistor (PFET) 220, resistors 208, 212, 214, 218, and 222, soft start capacitor 224, and load output 226 arranged as shown in FIG. 2.

Input voltage source 202 may comprise any system, device, or apparatus for providing an input voltage $V_{IN}$ that may pass to load output 226 as output voltage $V_{OUT}$ when PFET 220 is activated (e.g., enabled, turned on, etc.). In some embodiments, input voltage $V_{IN}$ may be a direct current voltage of 24 volts.

Enable input 204 may comprise any suitable terminal or connection for applying a voltage $V_{ENABLE}$ indicative of whether PFET 220 is to be activated or deactivated (e.g., disabled, turned off, etc.). In some embodiments, enable voltage $V_{ENABLE}$ may comprise a logical binary signal, such that a first voltage level (e.g., "0," "low," "off") indicates that PFET 220 is to be deactivated and a second voltage level (e.g., "1," "high," "on") indicates that PFET 220 is to be activated.

NFET 206 may be coupled at its source terminal to a ground voltage and coupled to enable input 204 at its gate terminal such that a gate-to-source voltage of NFET 206 is approximately equal to enable voltage $V_{ENABLE}$. The drain terminal of NFET 206 may be coupled to the positive input terminal of input source 202 via a resistor 208. In a particular embodiment, a resistance of resistor 208 may be approximately 100 kiloohms.

NPN BJT 210 may be coupled at its base terminal to the drain terminal of NFET 206 and coupled at its emitter terminal to a ground voltage. The collector terminal of NPN BJT 210 may be coupled to the positive input terminal of input voltage source 202 via resistors 212 and 214. In a particular embodiment, a resistance of resistor 212 may be approximately 10 kiloohms and a resistance of resistor 214 may be approximately 47 kiloohms.

PNP BJT 216 may be coupled at its emitter terminal to the positive input terminal of input source 202. The base terminal of PNP BJT 216 may be coupled to the collector terminal of NPN BJT 210 via resistor 212 and may be coupled to the positive input terminal of input source 202 via resistor 214. The collector terminal of PNP BJT 216 may be coupled to resistor 218, PFET 220, resistor 222, and soft start capacitor 224 as further described below.

Together, NFET 206, NPN BJT 210, PNP BJT 216, and resistors 208, 212, and 214 may form a leakage reduction circuit 228 that, as described in greater detail below, may maintain a source-to-gate voltage $V_{SG}$ of PFET 220 at approximately zero volts when enable voltage $V_{ENABLE}$ indicates PFET 220 is to be deactivated, thus reducing or preventing any leakage current onto the gate or source of PFET 220 that may cause PFET 220 to be prematurely or otherwise improperly activated.

PFET 220 may be coupled at its gate terminal to the collector terminal of PNP BJT 216. The gate terminal of PFET 220 may also be coupled to its source terminal via resistor 218, wherein the source terminal may also be coupled to the positive input terminal of input source 202. In a particular embodiment, a resistance of resistor 218 may be approximately 1 megaohm. The gate terminal of PFET 220 may also be coupled to a ground voltage via resistor 222. In a particular embodiment, a resistance of resistor 222 may be approximately 1 megaohm. When the source-to-gate voltage $V_{SG}$ of PFET 220 exceeds a threshold voltage of PFET 220, PFET 220 may become activated such that it passes input voltage $V_{IN}$ to its drain terminal.

Soft start capacitor 224 may be coupled between the drain terminal of PFET 220 and the gate terminal of PFET 220. In operation, soft start capacitor 224 may have a capacitance value (e.g., 470 nanofarads in particular embodiments) such that when coupled to a load comprising a valve, after enabling valve load switch control subsystem 116 (e.g., by transitioning enable voltage $V_{ENABLE}$ from low to high), soft start capacitor 224 imposes a transient that causes output voltage $V_{OUT}$ to rise slowly, which may cause valve 124 to open. The slow rise time of output voltage $V_{OUT}$ may reduce or eliminate damage to fluidic conduits 126 that may occur if valve 124 were to be quickly turned on. The rise time of output voltage $V_{OUT}$ may be a function of the capacitance of soft start capacitor 224 and a load impedance of valve 124.

As mentioned above, leakage reduction circuit 228 may maintain a source-to-gate voltage $V_{SG}$ of PFET 220 at approximately zero volts when enable voltage $V_{ENABLE}$ indicates PFET 220 is to be deactivated. To illustrate, when enable voltage $V_{ENABLE}$ is low, NFET 206 may be deactivated. If an input voltage $V_{IN}$ is also applied, one of skill in the art would recognize that NPN BJT 210 would be activated which would in turn activate PNP BJT 216. Such activation of PNP BJT 216 may cause electrical coupling between the source and gate terminals of PFET 220, so as to create a virtual short circuit between the source and gate terminals of PFET 220, thus forcing the source-to-gate voltage $V_{SG}$ to approximately zero volts, and thus preventing source-to-gate voltage $V_{SG}$ from approaching or exceeding a threshold voltage that would induce leakage current through PFET 220.

When enable voltage $V_{ENABLE}$ is transitioned from low to high, NFET 206 may be activated, which in turn may deactivate NPN BJT 210. Deactivation of NPN BJT 210 may in turn (due to the relative resistances of resistors 212 and 214) cause PNP BJT 216 to deactivate. With PNP BJT 216 deactivated, the voltage divider of resistors 218 and 222 may cause source-to-gate voltage $V_{GS}$ to rise, thus activating PFET 220 and passing input voltage $V_{IN}$ to the drain terminal of PFET 220, as limited by transient effects of soft start capacitor 224.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A circuit comprising:
   a source input for receiving an input source voltage;
   a load output for generating an output voltage;
   a load switch coupled at its source terminal to the source input and coupled at its drain terminal to the load output, the load switch configured to pass the input source voltage to the load output when the load switch is activated;
   an enable input for receiving an enable voltage, the enable voltage indicative of whether the load switch is to be activated or deactivated; and
   a leakage reduction circuit coupled between the enable input and a gate terminal of the load switch, wherein the leakage reduction circuit is configured to electrically couple the gate terminal of the load switch to the source terminal of the load switch such that a source-to-gate voltage is maintained below a threshold voltage for activating the load switch when the enable voltage indicates that the load switch is to be deactivated, wherein the leakage reduction circuit comprises:
      an n-type field effect transistor coupled at its source terminal to a ground voltage and coupled at its gate terminal to the enable input such that a gate-to-source voltage of the n-type field effect transistor is approximately equal to the enable voltage;
      an n-p-n bipolar junction transistor coupled at its emitter terminal to the ground voltage and coupled at its base terminal to a drain terminal of the n-type field effect transistor; and
      a p-n-p bipolar junction transistor coupled at its emitter terminal to the source input, coupled at its base terminal to a collector terminal of the n-p-n bipolar junction transistor, and coupled at its collector terminal to the gate terminal of the load switch.

2. The circuit of claim 1, further comprising a capacitor coupled between the drain terminal of the load switch and gate terminal of the load switch.

3. The circuit of claim 2, wherein a capacitance of the capacitor is selected in order to provide for a soft start time of a valve coupled to the load output.

4. The circuit of claim 1, wherein the load switch comprises a p-type field effect transistor.

5. The circuit of claim 1, wherein the leakage reduction circuit is configured to electrically couple the gate terminal of the load switch to the source terminal of the load switch via a virtual short.

6. The circuit of claim 1, wherein the source-to-gate voltage is maintained at approximately zero volts.

7. The circuit of claim 1, wherein the base terminal of the p-n-p bipolar junction transistor is coupled to the collector terminal of the n-p-n bipolar junction transistor via a first resistor.

8. The circuit of claim 7, wherein the base terminal of the p-n-p bipolar junction transistor is coupled to the source terminal of the n-type field effect transistor via a second resistor.

9. The circuit of claim 1, wherein the gate terminal of the load switch is coupled to the source terminal of the load switch via a first resistor and the gate terminal of the load switch is coupled to the ground voltage via a second resistor.

10. A system comprising:
a valve;
a control circuit for controlling the valve, the control circuit comprising:
  a source input for receiving an input source voltage;
  a load output coupled to the valve for generating an output voltage for controlling the valve;
  a load switch coupled at its source terminal to the source input and coupled at its drain terminal to the load output, the load switch configured to pass the input source voltage to the load output when the load switch is activated;
  an enable input for receiving an enable voltage, the enable voltage indicative of whether the load switch is to be activated or deactivated; and
  a leakage reduction circuit coupled between the enable input and a gate terminal of the load switch, wherein the leakage reduction circuit is configured to electrically couple the gate terminal of the load switch to the source terminal of the load switch such that a source-to-gate voltage is maintained below a threshold voltage for activating the load switch when the enable voltage indicates that the load switch is to be deactivated, wherein the leakage reduction circuit comprises:
    an n-type field effect transistor coupled at its source terminal to a ground voltage and coupled at its gate terminal to the enable input such that a gate-to-source voltage of the n-type field effect transistor is approximately equal to the enable voltage;
    an n-p-n bipolar junction transistor coupled at its emitter terminal to the ground voltage and coupled at its base terminal to a drain terminal of the n-type field effect transistor; and
    a p-n-p bipolar junction transistor coupled at its emitter terminal to the source input, coupled at its base terminal to a collector terminal of the n-p-n bipolar junction transistor, and coupled at its collector terminal to the gate terminal of the load switch.

11. The system of claim 10, further comprising a capacitor coupled between the drain terminal of the load switch and gate terminal of the load switch.

12. The system of claim 11, wherein a capacitance of the capacitor is selected in order to provide for a soft start time of the valve.

13. The system of claim 10, wherein the load switch comprises a p-type field effect transistor.

14. The system of claim 10, wherein the leakage reduction circuit is configured to electrically couple the gate terminal of the load switch to the source terminal of the load switch via a virtual short.

15. The system of claim 10, wherein the source-to-gate voltage is maintained at approximately zero volts.

16. The system of claim 10, wherein the base terminal of the p-n-p bipolar junction transistor is coupled to the collector terminal of the n-p-n bipolar junction transistor via a first resistor.

17. The system of claim 16, wherein the base terminal of the p-n-p bipolar junction transistor is coupled to the source terminal of the n-type field effect transistor via a second resistor.

18. The system of claim 10, wherein the gate terminal of the load switch is coupled to the source terminal of the load switch via a first resistor and the gate terminal of the load switch is coupled to the ground voltage via a second resistor.

19. A method comprising, in a circuit comprising a source input for receiving an input source voltage, a load output for generating an output voltage, a load switch coupled at its source terminal to the source input and coupled at its drain terminal to the load output, the load switch configured to pass the input source voltage to the load output when the load switch is activated, and an enable input for receiving an enable voltage, the enable voltage indicative of whether the load switch is to be activated or deactivated, electrically coupling, with a leakage reduction circuit, the gate terminal of the load switch to the source terminal of the load switch such that a source-to-gate voltage is maintained below a threshold voltage for activating the load switch when the enable voltage indicates that the load switch is to be deactivated, wherein the leakage reduction circuit comprises:
  an n-type field effect transistor coupled at its source terminal to a ground voltage and coupled at its gate terminal to the enable input such that a gate-to-source voltage of the n-type field effect transistor is approximately equal to the enable voltage;
  an n-p-n bipolar junction transistor coupled at its emitter terminal to the ground voltage and coupled at its base terminal to a drain terminal of the n-type field effect transistor; and
  a p-n-p bipolar junction transistor coupled at its emitter terminal to the source input, coupled at its base terminal to a collector terminal of the n-p-n bipolar junction transistor, and coupled at its collector terminal to the gate terminal of the load switch.

* * * * *